United States Patent [19]

Schmittbetz

[11] Patent Number: 4,711,460
[45] Date of Patent: Dec. 8, 1987

[54] MOUNTED IMPLEMENT HITCH FOR FARM TRACTORS

[75] Inventor: Klaus Schmittbetz, Cologne, Fed. Rep. of Germany

[73] Assignee: Kloeckner-Humboldt-Deutz AG, Fed. Rep. of Germany

[21] Appl. No.: 863,110

[22] Filed: May 13, 1986

[30] Foreign Application Priority Data

May 15, 1985 [DE] Fed. Rep. of Germany ....... 3517489

[51] Int. Cl.$^4$ .................................................. B60D 1/00
[52] U.S. Cl. .................................. 280/460 A; 172/450
[58] Field of Search .......... 280/460 A, 460 R, 456 A, 280/456 R, 467; 172/450, 446, 447, 449, 439

[56] References Cited

U.S. PATENT DOCUMENTS

| | | | |
|---|---|---|---|
| 2,216,584 | 10/1940 | Boden | 280/460 R |
| 2,673,506 | 3/1954 | Miller et al. | 172/450 X |
| 3,310,123 | 3/1967 | Abbott | 172/450 |

Primary Examiner—John A. Pekar
Attorney, Agent, or Firm—Charles L. Schwab

[57] ABSTRACT

An implement hitch for a farm tractor in which a pair of lower draft arms having front and rear parts pivotally interconnected on laterally spaced vertical axes. A pair of cap screws extending through threaded openings in the front parts are engagable with the rear parts to selectively adjust the lateral position of an implement connected to the rear parts of the draft arms. The cap screws can be adjusted to either permit or prevent lateral sway of the rear parts of the draft arms.

5 Claims, 1 Drawing Figure

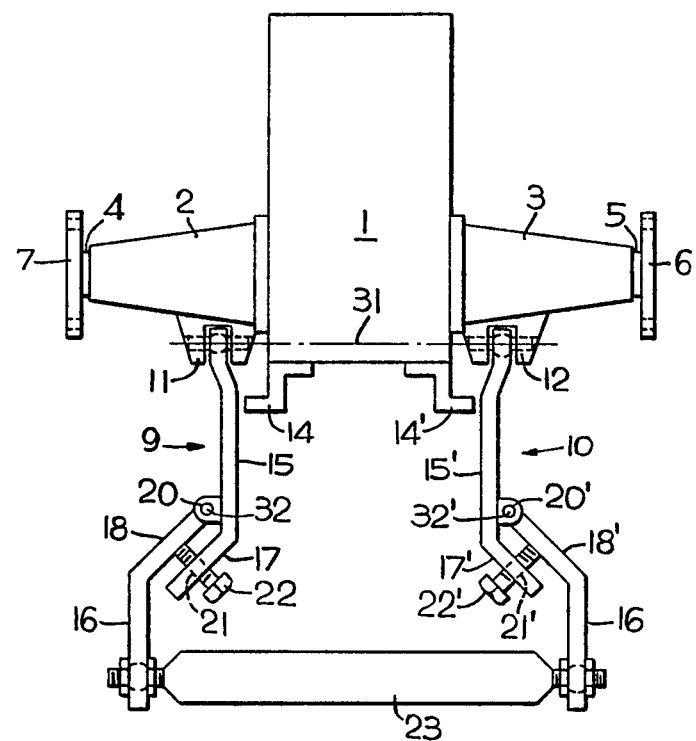

MOUNTED IMPLEMENT HITCH FOR FARM TRACTORS

TECHNICAL FIELD

This invention relates to an implement hitch for farm tractors having an upper arm and a pair of lower arms with the latter being connected in such a way that they, and the implement attached thereto, can be shifted laterally with respect to the tractor body and they can also be adjusted to permit or prevent lateral sway.

PRIOR ART STATEMENT

West German patent DE-OS No. 23 50 096 shows an implement hitch wherein the lower arms are each supported by a side brace. Both side braces run between the lower arms and a bearing frame which is fastened securely to the vehicle and the arms are supported at the bearing frames in such a way that they can be adjusted separately by means of cranks. With this arrangement, the lower arms can be infinitely adjusted to the extent of their allowable lateral movement. Cranks of this prior design are, however, practically inaccessible for adjustment on smaller tractors because of the compact design, so that adjustment of the movability of the side braces by means of the cranks is difficult. In addition, such a device for adjusting the sideways movability of the lower arms is very expensive.

OBJECTS AND SUMMARY OF THE INVENTION

It is a primarily purpose of this invention to provide an implement hitch for a tractor with means for adjusting the lateral movability of the lower arms which is readily accessible and which can be inexpensively manufactured.

This object is met by this invention by providing lower draft arms each of which include a first part attached to the tractor and a second part adapted for attachment to an implement, pivot means interconnecting the two parts on a vertical axis and an adjustment device between the parts selectively operable to pivot the second part relative to the first part whereby an implement attached to the draft arms is shifted laterally. The adjustment device and draft arms are constructed and arranged so that through operation of the adjustment means, the second part of said draft arms may be permitted to swing laterally or they may be prevented from swinging laterally. The parts of the draft arms, the pivot connection therebetween and the adjustment device are preferably arranged in such a way that they are easily accessible near the connecting elements for an implement or draft bar which is to be fastened to the draft arms. In addition, the pivot components for the arm parts and the adjustment device may be constructed of simple, easy to manufacture components.

In the preferred embodiment of the invention, the adjustment device is designed as a threaded element or cap screw which is threaded into a threaded hole in one of the arm parts and engages the other arm part. Preferably, the threaded element engages an end portion of the other arm part which is in lapped relation to a portion of the one arm part. The lapped portions of the arm parts may be parallel to each other with a predetermined clearance therebetween and the threaded opening may be located in the lapped portion of one of the arm parts.

Electric or hydraulic servomotors may be used to rotate the threaded elements individually or in unison through appropriate control means accessible to the operator.

BRIEF DESCRIPTION OF THE DRAWING

One embodiment of the invention is illustrated in the drawing which is a partial top view of a tractor with an implement hitch mounted thereon.

DETAILED DESCRIPTION OF THE DRAWING

Referring to the drawing, a transmission casing 1 is disposed at the rear end of the tractor and houses appropriate transmission gearing, not shown. Axle housings 2 and 3 are rigidly secured to laterally opposite sides of the tractor transmission casing 1 and rotatably support axles 4 and 5 having wheel mounting flanges 6 and 7 to which drive wheels, not shown, are secured. A three-point implement hitch is provided at the rear end of the tractor. Only the two lower draft arms 9 and 10 of the hitch are illustrated. The front ends of the lower draft arms are pivotally connected on a transverse axis 31 to a pair of laterally spaced bearing brackets 11 and 12 rigidly secured to the axle housings 2 and 3, respectively. A pair of laterally spaced stop frames 14, 14' are secured to the tractor casing 1 in confronting abuttable relation to the pair of horizontally extending lower arms 9 and 10 and serve to limit laterally inward swinging movement of the draft arms 9 and 10 about their pivot connections with the bearing brackets 11 and 12. Each of the two lower drafts arms 9 and 10 is constructed in two parts. The front parts 15, 15' pivotally connected to the brackets 11, 12 and extend rearwardly with diagonal rear end portions 17, 17' diverging rearwardly relative to the fore and aft direction of the tractor. The rear parts 16, 16' of the draft arms 9, 10 have forwardly converging front end portions 18, 18', the front ends of which are pivotally connected to the longitudinal portions of the front parts 15, 15' by pivot pins 20, 20' for relative pivotal movement about vertical axes 32, 32'. The diagonally positioned end portions 17, 17' are parallel to and in juxtaposed relation to the diagonally extending end portions 18, 18' and are spaced laterally inward therefrom to facilitate relative pivotal movement of the parts about the laterally spaced vertical axes 32, 32'. Threaded openings 21, 21' are provided in portions 17, 17' and threaded elements in the form of cap screws 22, 22' threadedly engage the threaded openings 21, 21' with their laterally outward ends in confronting, abuttable relation to the diagonal end portions 18, 18' of the arm parts 16, 16'. A drawbar 23 is shown connected to the rear ends of the arm parts 16, 16' of the draft arms 9, 10, however, the rear ends of the parts 16, 16' are adapted to optionally connect to various ground working implements, planters or other tools.

With this hitch arrangement, the threaded elements 22, 22' of both lower draft arms 9 and 10 can be adjusted selectively in such a way that the drawbar 23 or an attached implement will have a fixed lateral position relative to the tractor or operates with a predetermined lateral oscillation or sway. The position of the threaded elements 22, 22' makes them easily accessible for servicing and easy to adjust. Space is available for the operator to turn the cap screws 22, 22' by using a wrench, not shown, which fits on the heads of the screws.

The embodiments of the invention in which an exclusive property or privilege is claimed are defined as follows:

1. In combination with a farm tractor, an implement hitch comprising:
    a pair of longitudinally extending lower draft arms with first parts connected to the tractor and second parts adapted for connection to an implement,
    means pivotally interconnecting said first parts to said second parts, respectively, for relative lateral swinging movement of said second parts about first and second laterally spaced vertical axes, respectively,
    a first adjustment element adjustably mounted on one of said parts of one of said draft arms at a location spaced from said first vertical axis, said first adjustment element being operatively interposed between said parts of said one draft arm and operable to adjust said parts about said first vertical axis, and
    a second adjustment element adjustably mounted on one of said parts of the other of said draft arms at a location spaced from said second vertical axis, said second adjustment element being operatively interposed between said parts of said other draft arm and operable to adjust said parts about said second vertical axis.

2. The combination of claim 1 wherein said first and second parts of each of said draft arms have juxtaposed portions and wherein one of said portions presents a threaded opening and wherein said adjustment element is threaded and in threaded engagement with said opening.

3. The combination of claim 2 wherein said juxtaposed portions are disposed diagonally in respect to the fore and aft direction of the tractor and are substantially parallel to each other with a clearance therebetween.

4. The combination of claim 2 wherein said threaded opening is in the juxtaposed portion of said first part.

5. The combination of claim 1 wherein said adjustment elements are selectively adjustable to permit lateral side sway of said second parts and wherein said elements are selectively adjustable to prevent lateral side sway of said second parts.

* * * * *